United States Patent
Freeman et al.

(10) Patent No.: US 11,085,643 B2
(45) Date of Patent: Aug. 10, 2021

(54) AIR SWIRLER ARRANGEMENT FOR A FUEL INJECTOR OF A COMBUSTION CHAMBER

(71) Applicant: ROLLS-ROYCE plc, London (GB)

(72) Inventors: Richard Freeman, Derby (GB); Christopher Rafferty, Derby (GB); Thomas Jones, Derby (GB); Matthew Murphy, Derby (GB); Nicholas M. Brown, Nottingham (GB)

(73) Assignee: ROLLS-ROYCE plc, London (GB)

( * ) Notice: Subject to any disclaimer, the term of this patent is extended or adjusted under 35 U.S.C. 154(b) by 151 days.

(21) Appl. No.: 16/254,705

(22) Filed: Jan. 23, 2019

(65) Prior Publication Data

US 2019/0249876 A1    Aug. 15, 2019

(30) Foreign Application Priority Data

Feb. 12, 2018 (GB) ...................................... 1802251

(51) Int. Cl.
  *F23R 3/14*  (2006.01)
  *F23R 3/28*  (2006.01)
  (Continued)

(52) U.S. Cl.
  CPC .............. *F23R 3/14* (2013.01); *B01F 5/0068* (2013.01); *B01F 15/00922* (2013.01);
  (Continued)

(58) Field of Classification Search
  CPC .... F23R 3/14; F23R 3/28; F23R 3/283; F23R 3/286; F05D 2230/31
  See application file for complete search history.

(56) References Cited

U.S. PATENT DOCUMENTS

| 4,322,945 A | 4/1982 | Peterson et al. |
| 4,365,470 A | 12/1982 | Matthews et al. |

(Continued)

FOREIGN PATENT DOCUMENTS

| EP | 0654639 A1 | 5/1995 |
| EP | 0939275 A2 | 9/1999 |

(Continued)

OTHER PUBLICATIONS

Great Britain search report dated Jul. 31, 2018, issued in GB Patent Application No. 1802251.7.

(Continued)

*Primary Examiner* — Todd E Manahan
*Assistant Examiner* — Thuyhang N Nguyen
(74) *Attorney, Agent, or Firm* — Shumaker & Sieffert, P.A.

(57) ABSTRACT

An air swirler arrangement comprises a coaxial arrangement of an inner and an outer air swirler passage. Each air swirler passage comprises a radial flow swirler. Air swirler arrangement comprises a coaxial arrangement of first, second and third members. Second member has radially extending upstream portion spaced axially from first member and a convergent portion. Third member has a radially extending upstream portion spaced axially from the upstream portion of second member and a radially inner surface having convergent and divergent downstream portions and a radially outer surface having a divergent downstream portion. First, second and third members the vanes of the radial flow swirlers is a monolithic structure. Plurality of circumferentially spaced passages are provided within the third member and each passage has an inlet in the surface and an outlet arranged to direct fluid onto the divergent portion of the surface or the surface of the third member.

18 Claims, 7 Drawing Sheets

(51) Int. Cl.
    *F23D 14/00*     (2006.01)
    *F23R 3/10*     (2006.01)
    *F23D 11/00*     (2006.01)
    *F23D 11/38*     (2006.01)
    *F23C 7/00*     (2006.01)
    *F23M 5/08*     (2006.01)
    *B33Y 10/00*     (2015.01)
    *B33Y 80/00*     (2015.01)
    *B29C 64/153*     (2017.01)
    *B01F 5/00*     (2006.01)
    *B01F 15/00*     (2006.01)
    *F23R 3/46*     (2006.01)

(52) U.S. Cl.
    CPC ............ *B29C 64/153* (2017.08); *B33Y 10/00* (2014.12); *B33Y 80/00* (2014.12); *F23C 7/004* (2013.01); *F23D 11/00* (2013.01); *F23D 11/383* (2013.01); *F23D 14/00* (2013.01); *F23M 5/085* (2013.01); *F23R 3/10* (2013.01); *F23R 3/28* (2013.01); *F23R 3/283* (2013.01); *F23R 3/286* (2013.01); *F23R 3/46* (2013.01); *F23D 2213/00* (2013.01)

(56) References Cited

U.S. PATENT DOCUMENTS

| | | | |
|---|---|---|---|
| 5,353,599 A | 10/1994 | Johnson et al. | |
| 5,623,827 A * | 4/1997 | Monty | F23R 3/10 60/747 |
| 5,966,937 A | 10/1999 | Graves | |
| 6,253,555 B1 | 7/2001 | Willis | |
| 6,834,505 B2 | 12/2004 | Al-Roub et al. | |
| 6,986,253 B2 | 1/2006 | Leen et al. | |
| 7,654,091 B2 * | 2/2010 | Al-Roub | F23R 3/283 60/776 |
| 8,061,142 B2 | 11/2011 | Kastrup et al. | |
| 10,295,186 B2 * | 5/2019 | Zink | F23R 3/286 |
| 10,801,726 B2 * | 10/2020 | Stevens | F23R 3/286 |
| 2007/0125085 A1 | 6/2007 | Commaret et al. | |
| 2007/0227147 A1 | 10/2007 | Cayre et al. | |
| 2007/0269757 A1 * | 11/2007 | Commaret | F23R 3/286 431/265 |
| 2008/0229750 A1 | 9/2008 | Sipson | |
| 2012/0272661 A1 | 11/2012 | Milburn | |
| 2014/0241871 A1 | 8/2014 | Gregory et al. | |
| 2014/0250917 A1 | 9/2014 | Garry | |
| 2015/0059349 A1 | 3/2015 | Patel et al. | |
| 2015/0159874 A1 | 6/2015 | Toon et al. | |
| 2015/0292743 A1 | 10/2015 | Mook et al. | |
| 2016/0003156 A1 | 1/2016 | Hanson | |
| 2017/0009995 A1 | 1/2017 | Witham et al. | |
| 2017/0248319 A1 * | 8/2017 | McMahan | B22F 7/02 |
| 2018/0058696 A1 * | 3/2018 | Danis | F23R 3/14 |

FOREIGN PATENT DOCUMENTS

| | | |
|---|---|---|
| EP | 2481982 | 8/2012 |
| EP | 2609372 A2 | 7/2013 |
| EP | 3062022 A1 | 8/2016 |
| FR | 3026827 | 4/2016 |
| GB | 2134243 | 8/1984 |

OTHER PUBLICATIONS

Extended European Search Report from counterpart EP Application No. 19152075.8 dated Apr. 1, 2019, 12 pgs.

Response to Extended European Search Report from counterpart EP Application No. 19152075.8 dated Apr. 1, 2019, filed Feb. 14, 2020, 54 pgs.

Extended Search Report from counterpart European Application No. 21155390.4-1017, dated May 26, 2021, 13 pp.

* cited by examiner

AIR SWIRLER ARRANGEMENT FOR A FUEL INJECTOR OF A COMBUSTION CHAMBER

CROSS-REFERENCE TO RELATED APPLICATIONS

This application is based upon and claims the benefit of priority from British Patent Application No. GB 1802251.7, filed on 12 Feb. 2018, the entire contents of which are incorporated by reference.

BACKGROUND

Technical Field

The present disclosure relates to an air swirler arrangement for a fuel injector of a combustion chamber and in particular to an air swirler arrangement for a fuel injector for a gas turbine engine combustion chamber.

Description of the Related Art

A known gas turbine engine combustion chamber arrangement comprises a combustion chamber and a plurality of rich burn fuel injectors. The combustion chamber comprises an upstream end wall which has a plurality of apertures. Each fuel injector comprises a fuel feed arm and a fuel injector head having an air-blast fuel injector. The fuel injector head of each fuel injector locates coaxially in a corresponding one of the apertures in the upstream wall of the combustion chamber. The air-blast fuel injector comprises an air swirler arrangement having a coaxial arrangement of an inner air swirler passage, an intermediate air swirler passage and an outer air swirler passage. Each air swirler passage comprises an axial flow swirler. A fuel supply passage is arranged to supply fuel to the inner air swirler passage.

Another known gas turbine engine combustion chamber arrangement comprises a combustion chamber, a plurality of air swirler arrangements and a plurality of rich burn fuel injectors. The combustion chamber comprises an upstream end wall which has a plurality of apertures. Each air swirler arrangement is arranged coaxially with a corresponding one of the apertures in the upstream wall of the combustion chamber. Each air swirler arrangement comprises a coaxial arrangement of an inner air swirler passage and an outer air swirler passage. Each air swirler passage comprises a radial flow swirler. Each fuel injector comprises a fuel feed arm and a fuel injector head and the fuel injector head of each fuel injector is arranged coaxially in a corresponding one of the air swirler arrangements. Each fuel injector head has fuel supply passage arranged to supply fuel to the inner air swirler passage of the corresponding air swirler arrangement.

SUMMARY

The present disclosure seeks to provide an improved air swirler arrangement of the latter type.

According to a first aspect of the present disclosure there is provided an air swirler arrangement comprising a coaxial arrangement of an inner air swirler passage and an outer air swirler passage, each air swirler passage comprising a radial flow swirler, the air swirler arrangement comprising a first member arranged radially relative to the axis of the air swirler arrangement, the first member having a central aperture, a second member spaced axially from the first member and arranged coaxially with the axis of the air swirler arrangement, the second member having a radially extending upstream portion and a convergent portion, a third member arranged coaxially around the second member, the third member having a radially extending upstream portion spaced axially from the radially extending upstream portion of the second member, the third member having a radially inner surface having a convergent portion and a divergent downstream portion and a radially outer surface having a divergent downstream portion, a first plurality of circumferentially spaced swirl vanes extending axially between the first member and the radially extending upstream portion of the second member, a second plurality of circumferentially spaced swirl vanes extending axially between the radially extending upstream portion of the second member and the radially extending upstream portion of the third member, the first member, the second member, the third member, the first plurality of swirl vanes and the second plurality of swirl vanes is a unitary monolithic structure, a plurality of circumferentially spaced passages within the third member, each passage has an inlet in a radially outer surface of the third member and an outlet arranged to direct fluid onto the divergent portion of the radially inner surface of the third member or arranged to direct fluid onto the divergent portion of the radially outer surface of the third member.

Each passage may have a convergent portion between the inlet and the outlet.

Each passage may have a convergent portion adjacent the outlet.

Each passage may have a circular outlet or a rectangular outlet. Each passage may have a divergent outlet. The outlet of each passage may open into an annular slot.

The outlet of each passage may be arranged tangentially to the divergent portion of the radially outer surface of the third member.

The outlet of each passage may be arranged at a shallow angle to the divergent portion of the radially inner surface of the third member. The shallow angle may be 20° or less. The shallow angle may be 15° or less. The shallow angle may be 10° or less.

Each passage may have one or more axially extending portions each one of which is circular cross-section. Each passage may have one or more radially and axially extending portions each one of which is part circular in cross-section and has an angled roof defined by two intersecting tangents to the part circular portion, the angled roof defines the radially outer surface of the passage.

The third member may have an annular chamber arranged therein. At least some of the passages may have a first portion connecting the inlet and the annular chamber and a second portion connecting the annular chamber and the outlet. The annular chamber may have a circular cross-section and there is a second plurality of circumferentially spaced passages within the third member, each second passage has an inlet in a radially outer surface of the third member and an outlet arranged to direct fluid into the annular chamber.

The annular chamber may be arranged coaxially within the third member.

There may be a first plurality of circumferentially spaced passages within the third member, each passage of the first plurality of circumferentially spaced passages has an inlet in a radially outer surface of the third member and an outlet arranged to direct fluid onto the divergent portion of the radially inner surface of the third member and a second plurality of circumferentially spaced passages within the third member, each passage of the second plurality of circumferentially spaced passages has an inlet in a radially outer surface of the third member and an outlet arranged to direct fluid onto the divergent portion of the radially outer surface of the third member.

According to a second aspect of the present disclosure there is provided a combustion chamber comprising an upstream end wall having a least one aperture, each aperture having an air swirler arrangement arranged coaxially therein, each aperture having an associated fuel injector, each air swirler arrangement comprising a coaxial arrangement of an inner air swirler passage and an outer air swirler passage, each air swirler passage comprising a radial flow swirler, the air swirler arrangement comprising a first member arranged radially relative to the axis of the air swirler arrangement, the first member having a central aperture, a second member spaced axially from the first member and arranged coaxially with the axis of the air swirler arrangement, the second member having a radially extending upstream portion and a convergent portion, a third member arranged coaxially around the second member, the third member having a radially extending upstream portion spaced axially from the radially extending upstream portion of the second member, the third member having a radially inner surface having a convergent portion and a divergent downstream portion and a radially outer surface having a divergent downstream portion, a first plurality of circumferentially spaced swirl vanes extending axially between the first member and the radially extending upstream portion of the second member, a second plurality of circumferentially spaced swirl vanes extending axially between the radially extending upstream portion of the second member and the radially extending upstream portion of the third member, the first member, the second member, the third member, the first plurality of swirl vanes and the second plurality of swirl vanes is a unitary monolithic structure, a plurality of circumferentially spaced passages within the third member, each passage has an inlet in a radially outer surface of the third member and an outlet arranged to direct fluid onto the divergent portion of the radially inner surface of the third member or arranged to direct fluid onto the divergent portion of the radially outer surface of the third member, each air swirler arrangement having a fuel injector arranged in the aperture in the first member.

The combustion chamber may be an annular combustion chamber and the upstream end wall having a plurality of circumferentially spaced apertures.

The combustion chamber may be a tubular combustion chamber and the upstream end wall having a single aperture.

According to a third aspect of the present disclosure there is provided a method of manufacturing an air swirler arrangement, the air swirler arrangement comprising a coaxial arrangement of an inner air swirler passage and an outer air swirler passage, each air swirler passage comprising a radial flow swirler, the air swirler arrangement comprising a first member arranged radially relative to the axis of the air swirler arrangement, the first member having a central aperture, a second member spaced axially from the first member and arranged coaxially with the axis of the air swirler arrangement, the second member having a radially extending upstream portion and a convergent portion, a third member arranged coaxially around the second member, the third member having a radially extending upstream portion spaced axially from the radially extending upstream portion of the second member, the third member having a radially inner surface having a convergent portion and a divergent downstream portion and a radially outer surface having a divergent downstream portion, a first plurality of circumferentially spaced swirl vanes extending axially between the first member and the radially extending upstream portion of the second member, a second plurality of circumferentially spaced swirl vanes extending axially between the radially extending upstream portion of the second member and the radially extending upstream portion of the third member, the first member, the second member, the third member, the first plurality of swirl vanes and the second plurality of swirl vanes is a unitary monolithic structure, a plurality of circumferentially spaced passages within the third member, each passage has an inlet in a radially outer surface of the third member and an outlet arranged to direct fluid onto the divergent portion of the radially inner surface of the third member or arranged to direct fluid onto the divergent portion of the radially outer surface of the third member, the method comprising manufacturing the air swirler arrangement by additive manufacturing.

The method may comprise manufacturing the air swirler arrangement by powder bed deposition.

The method may comprise manufacturing the air swirler arrangement by powder bed laser deposition or powder bed electron beam deposition.

The method may comprise building the air swirler arrangement layer by layer in an axial direction of the air swirler arrangement.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE FIGURES

Embodiments will now be described by way of example only, with reference to the Figures, in which.

DETAILED DESCRIPTION

Figure 1:
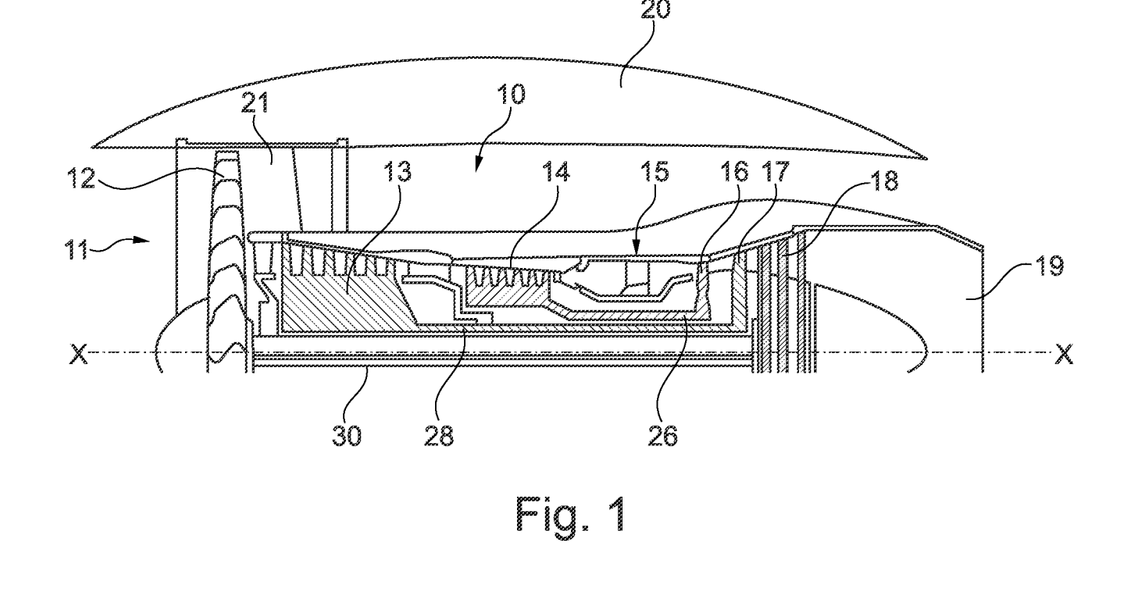
FIG. 1 is a cross-sectional side view of a gas turbine engine.

With reference to FIG. 1, a gas turbine engine is generally indicated at 10, having a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A nacelle 20 generally surrounds the engine 10 and defines both the intake 11 and the exhaust nozzle 19.

The gas turbine engine 10 works in the conventional manner so that air entering the intake 11 is accelerated by the fan 12 to produce two air flows: a first air flow into the intermediate pressure compressor 13 and a second air flow which passes through a bypass duct 21 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low pressure turbines 17, 18 and 19 respectively drive the high pressure compressor 15, intermediate pressure compressor 14 and the fan 13 respectively, each by a suitable interconnecting shaft 26, 28 and 30 respectively.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
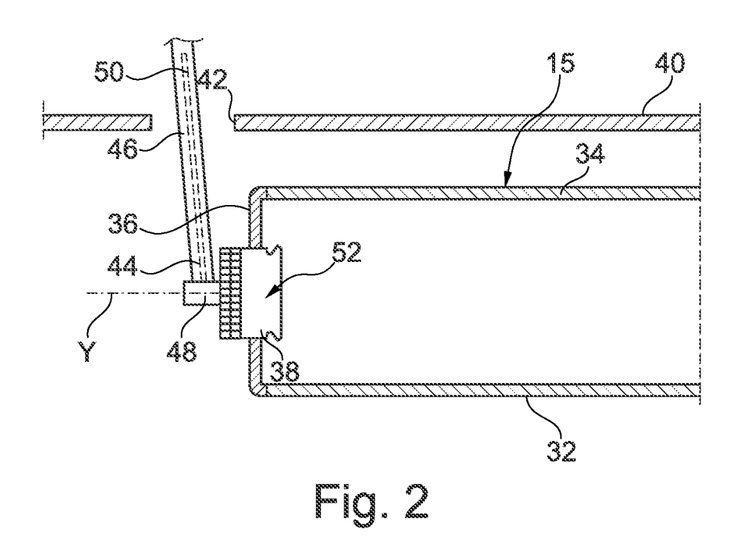
FIG. 2 is an enlarged cross-sectional view of an annular combustion chamber of the gas turbine engine.

The combustion chamber 15 is shown more clearly in FIG. 2. The combustion chamber 15 is an annular combustion chamber and comprises an inner annular wall 32, an outer annular wall 34 and an upstream wall 36. The upstream end wall 36 has a plurality of circumferentially spaced apertures, for example equi-circumferentially spaced apertures, 38. The combustion chamber 15 is surrounded by a combustion chamber casing 40 and the combustion chamber casing 40 has a plurality of circumferentially spaced apertures 42. The combustion chamber 15 also has a plurality of fuel injectors 44 and each fuel injector 40 extends radially through a corresponding one of the apertures 42 in the combustion chamber casing 40 and locates in a corresponding one of the apertures 38 in the upstream end wall 36 of the combustion chamber 15 to supply fuel into the combustion chamber 15.

The fuel injector 44 comprises a fuel feed arm 46 and a fuel injector head 48. The fuel feed arm 46 has a fuel passage 50 for the supply of fuel to the fuel injector head 48. The fuel injector head 48 has an axis Y and the fuel feed arm 46 extends generally radially with respect to the axis Y of the fuel injector head 48 and also generally radially with respect to the axis X of the turbofan gas turbine engine 10. The axis Y of each fuel injector head 48 is generally aligned with the axis of the corresponding aperture 38 in the upstream end wall 36 of the combustion chamber 15.

The combustion chamber 15 also has a plurality of air swirler arrangements 52 and each aperture 38 has a corresponding one of the air swirler arrangements 52 arranged coaxially therein. Each air swirler arrangement 52, as shown more clearly in FIGS. 3 and 4, has an axis U and comprises a coaxial arrangement of an inner air swirler passage 54 and an outer air swirler passage 56. Each air swirler passage 54, 56 comprises a radial flow swirler 58 and 60 respectively. The air swirler arrangement 52 comprises a first member 62 arranged radially relative/perpendicularly to the axis of the air swirler arrangement 52 and the first member 62 has a central aperture 64. A second member 66 is spaced axially from the first member 62 and arranged coaxially with the axis of the air swirler arrangement 52. The second member 66 has a radially extending upstream portion 68 and a convergent portion 70. A third member 72 is arranged coaxially around the second member 66. The third member 72 has a radially extending upstream portion 74 spaced axially from the radially extending upstream portion 68 of the second member 66. The third member 72 has a radially inner surface 76 having a convergent portion 78 and a divergent downstream portion 80 and a radially outer surface 82 having a divergent downstream portion 84. A first plurality of circumferentially spaced swirl vanes 86 extend axially between the first member 62 and the radially extending upstream portion 68 of the second member 66 and a second plurality of circumferentially spaced swirl vanes 88 extend axially between the radially extending upstream portion 68 of the second member 66 and the radially extending upstream portion 74 of the third member 72. The first member 62, the second member 66, the third member 72, the first plurality of swirl vanes 86 and the second plurality of swirl vanes 88 is a unitary monolithic structure.

Figure 3:
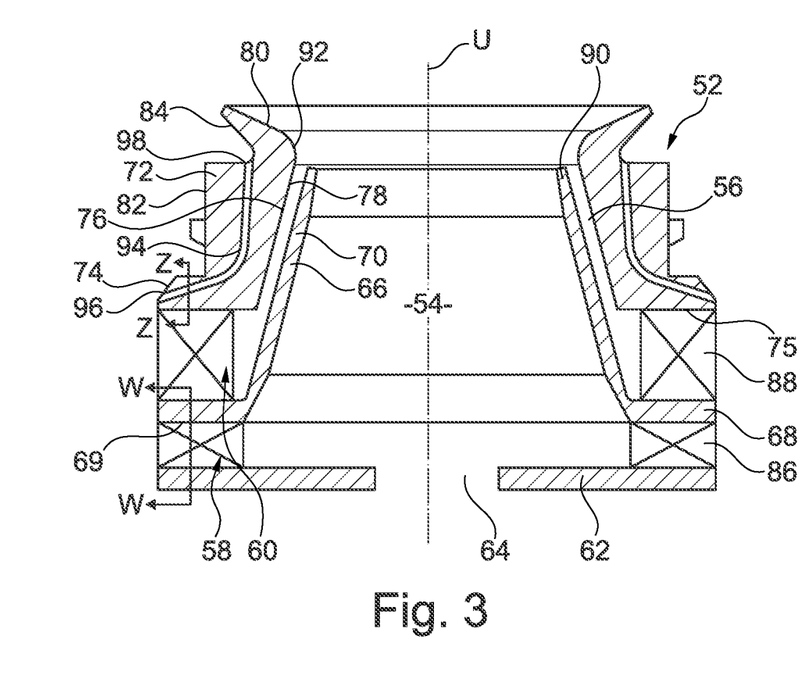
FIG. 3 is a further enlarged cross-sectional view of an air swirler arrangement according to the present disclosure.

The combustion chamber 15 also has a plurality of fuel injector seals, not shown. Each fuel injector seal is provided between a fuel injector head 48 and the corresponding air swirler arrangement 52 to allow the fuel injector head 48 to move radially relative to the aperture 64 in the corresponding air swirler arrangement 52 and hence to move radially and/or circumferentially relative to the upstream end wall 36 of the combustion chamber 15.

Figure 4:
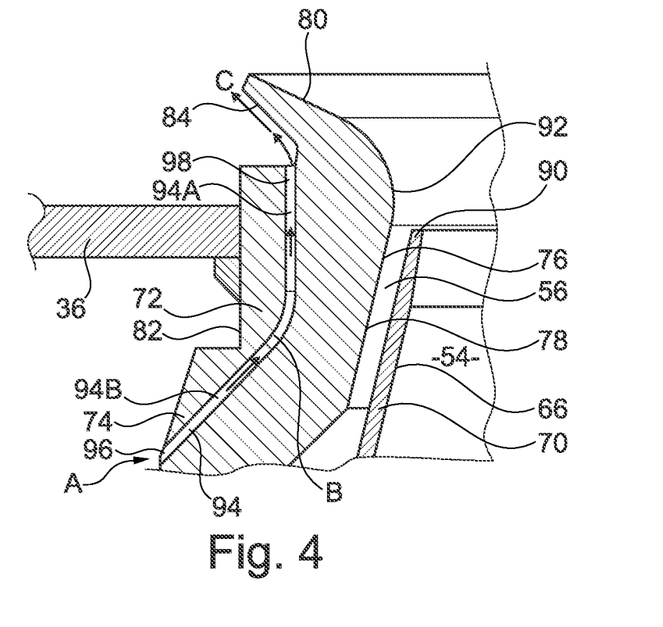
FIG. 4 is a further enlarged cross-sectional view of a portion of the air swirler arrangement according to the present disclosure.

The radially outer boundary of the inner air swirler passage 54 is defined by the second member 66 and the entrance to the inner swirler passage 54 is provided by the passages between the swirl vanes 86 of the radial flow swirler 58. The outer air swirler passage 56 is defined radially between the second member 66 and the third member 72 and the entrance to the outer air swirler passage 56 is provided by the passages between the swirl vanes 88 of the radial flow swirler 60. The radial flow swirlers 58 and 60 may be arranged to swirl the air in the same direction or in opposite directions.

The second member 66 has a downstream end 90 and the second member 72 has a minimum diameter, throat, 92 at the transition from the convergent portion 78 to the divergent downstream portion 80 of the radially inner surface 76 of the third member 72. The downstream end 90 of the second member 66 is arranged upstream of the throat 92 of the third member 72.

A plurality of circumferentially spaced passages 94 are provided within the third member 72. Each passage 94 has an inlet 96 in the radially outer surface 82 of the third member 72 and an outlet 98 arranged to direct fluid onto the divergent portion 84 of the radially outer surface 82 of the third member 72.

Figure 3A:
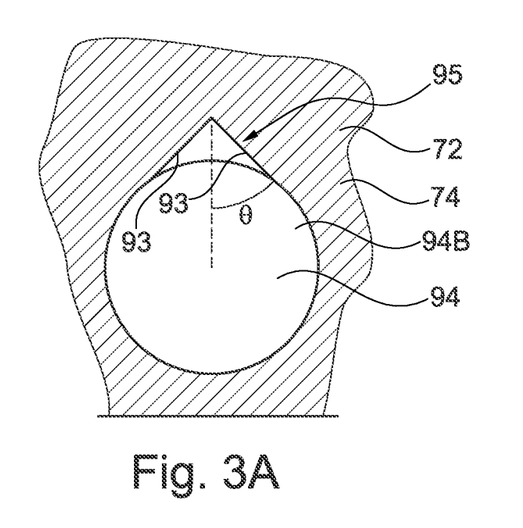
FIG. 3A is an enlarged cross-sectional view in the direction of arrows Z-Z in FIG. 3

Each passage 94 has one or more axially extending portions 94A, each one of which has a circular cross-section. Each passage 94 has one or more radially and axially extending portions 94B. Each one of the radially and axially extending portions 94B is part circular in cross-section and has an angled roof 95 defined by two intersecting tangents 93 to the part circular portion, the angled roof 95 defines the radially outer surface of the passage, as shown in FIG. 3A. Alternatively, the radially and axially extending portions 94B are circular in cross-section. Each passage 94 may have one or more radially extending portions, each one of which is part circular in cross-section and has an angled roof 95 defined by two intersecting tangents 93 to the part circular portion, the angled roof 95 defines the axially downstream surface of the passage 94, as shown in FIG. 3A. The two intersecting tangents 93 are each arranged at an angle θ to a radius of the circle of the passage 94 and at an angle to the axial direction of the air swirler arrangement 52 and the angle θ is less than or equal to 60° and more than or equal to 30°. Alternatively, each of the radially extending portions or radially and axially extending portions may have a pentagonal cross-section with two of the intersecting sides forming an angled roof, the angled roof defines the axially downstream surface of the passage or the radially outer surface of the passage. The two intersecting sides are each arranged at an angle θ to the axial direction of the air swirler arrangement 52 and the angle θ is less than or equal to 60° and more than or equal to 30°.

In the air swirler arrangement 52 shown in FIGS. 3 and 4, each passage 94 of the third member 72 comprises in flow series an inlet 96 in the radially outer surface 82 of the third member 72, a radially and axially extending portion 94B, an axially extending portion 94A and an outlet 98. Each passage 94 has a smooth transition from the radially and axially extending portion 94B to the axially extending portion 94A.

Each passage 94 has a circular outlet or a rectangular outlet. Each passage 94 may have a divergent outlet. The outlet 98 of each passage 94 may open into an annular slot. The outlet 98 of each passage 94 may be arranged tangentially to the divergent portion 84 of the radially outer surface 82 of the third member 72.

Figure 3B:
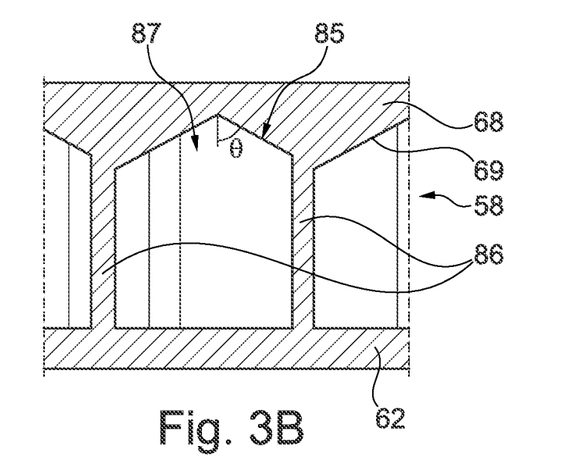
FIG. 3B is an enlarged cross-sectional vies in the direction of arrows W-W in FIG. 3.

Each of the passages between the swirl vanes 86 of the air swirler 58 also has an angled roof 85, the angled roof 85 defines the axially downstream surface of the passage, as shown in FIG. 3B. Thus, the axially upstream surface 69 of the radially extending upstream portion 68 of the second member 66 facing the first member 62 is shaped to define the angled roofs 85 of the passages between the swirl vanes 86 of the air swirler 58. The two intersecting sides 87 are each arranged at an angle θ to the axial direction of the air swirler arrangement 52 and the angle θ is less than or equal to 60° and more than or equal to 30°. Similarly, each of the passages between the swirl vanes 88 of the air swirler 60 also has an angled roof 89, the angled roof 89 defines the axially downstream surface of the passage. Thus, the axially upstream surface 75 of the radially extending upstream portion 74 of the third member 72 facing the radially extending upstream portion 68 of the second member 66 is shaped to define the angled roofs of the passages between the swirl vanes 88 of the air swirler 60. The two intersecting sides are each arranged at an angle θ to the axial direction of the air swirler arrangement 52 and the angle θ is less than or equal to 60° and more than or equal to 30°.

In operation a flow of coolant, for example air, A flows into the inlets 96 of the passages 94 and flows B through the radially and axially extending portions 94B and an axially extending portions 94A and out of the outlets 98. The flow of coolant through the passages 94 provides internal cooling of the air swirler arrangement 52. The flow of coolant C exiting the outlets 98 of the passages 94 is directed onto the divergent portion 84 of the radially outer surface 82 of the third member 72 to provide cooling of the divergent portion of the third member 72. The coolant issuing from the outlets 98 forms a film of coolant, air, on the divergent portion 84 of the radially outer surface 82 of the third member 72. The divergent portion of the third member 72 is in close proximity to and is subjected to the hot gases within the combustion chamber 15.

The addition of the passages 94 helps to extend the service life of the air swirler arrangement 52 by reducing thermal loads. The passages 94 allow regions of the air swirler arrangement 52 exposed to the highest thermal load, highest temperatures, to be cooled through the use of complex cooling passages in specific regions of the air swirler arrangement 52. Hence degradation of the air swirler arrangement 52 due to adverse operating conditions, e.g. the very high temperatures in the combustion chamber, is reduced and the service life of the air swirler arrangement 52 is increased.

Figure 5:
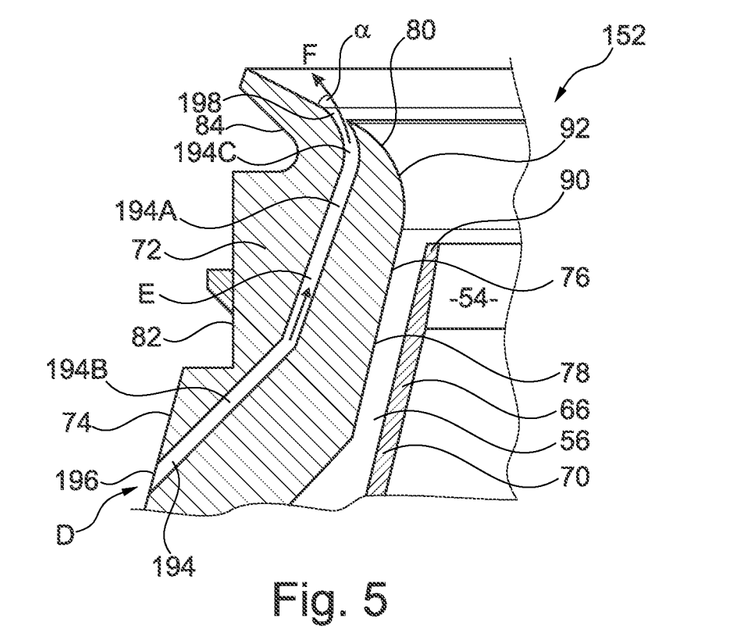
FIG. 5 is a further enlarged cross-sectional view of a portion of an alternative air swirler arrangement according to the present disclosure.

An alternative air swirler arrangement 152 according to the present disclosure is shown in FIG. 5. The air swirler arrangement 152 is similar to the air swirler arrangement 52 shown in FIGS. 3 and 4 and like parts are denoted by like numerals. The air swirler arrangement 152 differs in that it has a different arrangement of passages 194. A plurality of circumferentially spaced passages 194 are provided within the third member 72. Each passage 194 has an inlet 196 in the radially outer surface 82 of the third member 72 and an outlet 198 arranged to direct fluid onto the divergent portion 80 of the radially inner surface 76 of the third member 72.

Each passage 194 has one or more axially extending portions 194A, 194B 194C, each one of which has a circular cross-section. Each one of the radially and axially extending portions 194A, 194B, 194C is part circular in cross-section and has an angled roof defined by two intersecting tangents to the part circular portion, the angled roof 95 defines the radially outer surface of the passage, as shown in FIG. 3A. Alternatively, the radially and axially extending portions 194A, 194B, 194C are circular in cross-section. Each passage 94 may have one or more radially extending portions, each one of which is part circular in cross-section and has an angled roof defined by two intersecting tangents to the part circular portion, the angled roof defines the axially downstream surface of the passage, as shown in FIG. 3A. The two intersecting tangents are each arranged at an angle θ to a radius of the circle of the passage and at an angle to the axial direction of the air swirler arrangement 52 and the angle θ is less than or equal to 60° and more than or equal to 30°. Alternatively, each of the radially extending portions or radially and axially extending portions may have a pentagonal cross-section with two of the intersecting sides forming an angled roof, the angled roof defines the axially downstream surface of the passage or the radially outer surface of the passage. The two intersecting sides are each arranged at an angle θ to the axial direction of the air swirler arrangement 52 and the angle θ is less than or equal to 60° and more than or equal to 30°.

In the air swirler arrangement 152 shown in FIG. 5, each passage 194 of the third member 172 comprises in flow series an inlet 196 in the radially outer surface 82 of the third member 72, a radially and axially extending portion 194B, a radially and axially extending portion 194A, a radially and axially extending portion 194C and an outlet 198. Each passage 194 has a smooth transition from the radially and axially extending portion 194B to the radially and axially extending portion 194A and a smooth transition from the radially and axially extending portion 194A to the radially and axially extending portion 194C. The radially and axially extending portions 194B and 194A are arranged at different angles to the axis of the air swirler arrangement 152 and they extend radially inwardly from the inlet 196 to the radially and axially extending portion 194C. The radially and axially extending portion 194C extends radially outwardly from the radially and axially extending portion 194A to the outlet 198.

Each passage 194 has a circular outlet or a rectangular outlet. Each passage 194 may have a divergent outlet. The outlet 198 of each passage 194 may open into an annular slot.

The outlet 198 of each passage 194 is arranged at a shallow angle α to the divergent portion 80 of the radially inner surface 76 of the third member 72. The shallow angle α is 20° or less. The shallow angle α may be 15° or less. The shallow angle α may be 10° or less.

In operation a flow of coolant, for example air, D flows into the inlets 196 of the passages 194 and flows E through the radially and axially extending portions 194B, 194A and 194C and out of the outlets 198. The flow of coolant through the passages 194 provides internal cooling of the air swirler arrangement 152. The flow of coolant F exiting the outlets 198 of the passages 194 is directed onto the divergent portion 80 of the radially inner surface 76 of the third member 72 to provide cooling of the divergent portion of the third member 72. The divergent portion of the third member 72 is in close proximity to and is subjected to the hot gases within the combustion chamber 15. The flow of coolant F exiting the outlets 198 of the passages 194 re-energises the boundary layer on the divergent portion 80 of the radially inner surface 76 of the third member 72. The flow of coolant issuing from the outlets 98 forms a film of coolant on the divergent portion 80 of the radially inner surface 76 of the third member 72

The addition of the passages 194 helps to extend the service life of the air swirler arrangement 152 by reducing thermal loads. The passages 194 allow regions of the air swirler arrangement 152 exposed to the highest thermal load, highest temperatures, to be cooled through the use of complex cooling passages in specific regions of the air swirler arrangement 152. Hence degradation of the air swirler arrangement 152 due to adverse operating conditions, e.g. the very high temperatures in the combustion chamber, is reduced and the service life of the air swirler arrangement 152 is increased.

The passages 194 within the third member 172 are arranged to provide additional aerodynamic benefits by controlled ejection of air jets over the divergent portion 80 of the radially inner surface 76 of the third member 72. The controlled flow of air is compensates for the disadvantage of a poor surface finish produced by additive manufacturing. Passages at a shallow angle relative to a surface, essential to maximising the benefit of boundary layer control, are typically difficult to manufacture using traditional manufacturing techniques but may be produced by additive manufacturing. Thus, the passages 194 enable the air swirler arrangement 152 to be produced by additive manufacturing without the need for post processing, e.g. polishing, of the divergent portion 80 of the radially inner surface 76 of the third member 72.

Figure 6:
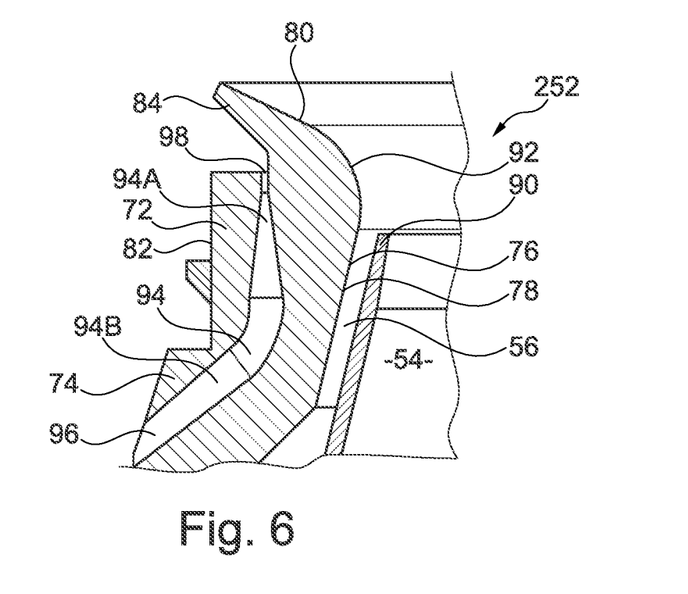
FIG. 6 is a further enlarged cross-sectional view of a portion of another air swirler arrangement according to the present disclosure.

Another air swirler arrangement 252 according to the present disclosure is shown in FIG. 6. The air swirler arrangement 252 is similar to the air swirler arrangement 52 shown in FIGS. 3 and 4 and like parts are denoted by like numerals. The air swirler arrangement 252 differs in that the axially extending portion 94A of each passage 94 is a convergent portion of the passage 94 between the inlet 96 and the outlet 98. The convergent portion of each passage 94 may be adjacent the outlet 98. The radially and axially extending portion 94B of each passage 94 has a larger cross-sectional area than the axially extending portion 94A and the axially extending portion 94A converges towards the outlet 98. The flow of air through the passages 94 experiences less losses because the cross-sectional area is larger in the portion 94B, which is important when the passages 94 have a rough surface finish due to being produced by additive manufacturing. The flow of air through the passages 94 is throttled because of the convergent portion of the passage 94A which increases the velocity of the air and hence increase the length of an air formed on the divergent portion 84 of the radially outer surface 82 of the third member 72.

Each passage 94 may have a circular outlet or a rectangular outlet. Each passage 94 may have a divergent outlet. The outlet 98 of each passage 94 may open into an annular slot. The outlet 98 of each passage 94 may be arranged tangentially to the divergent portion 84 of the radially outer surface 82 of the third member 72.

Figure 7:
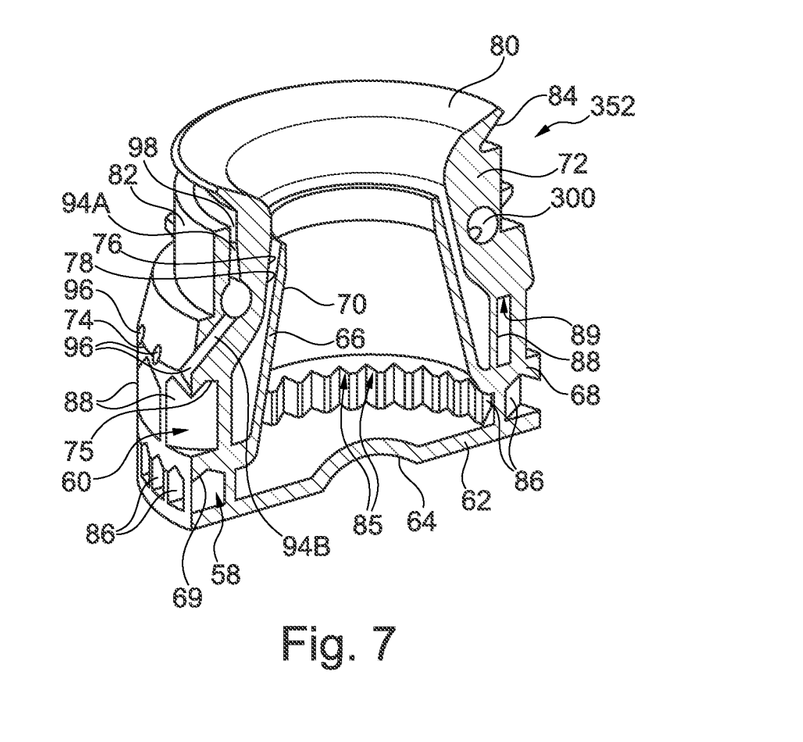
FIG. 7 is a part cross-sectional perspective view of a further air swirler arrangement according to the present disclosure.
Figure 8:
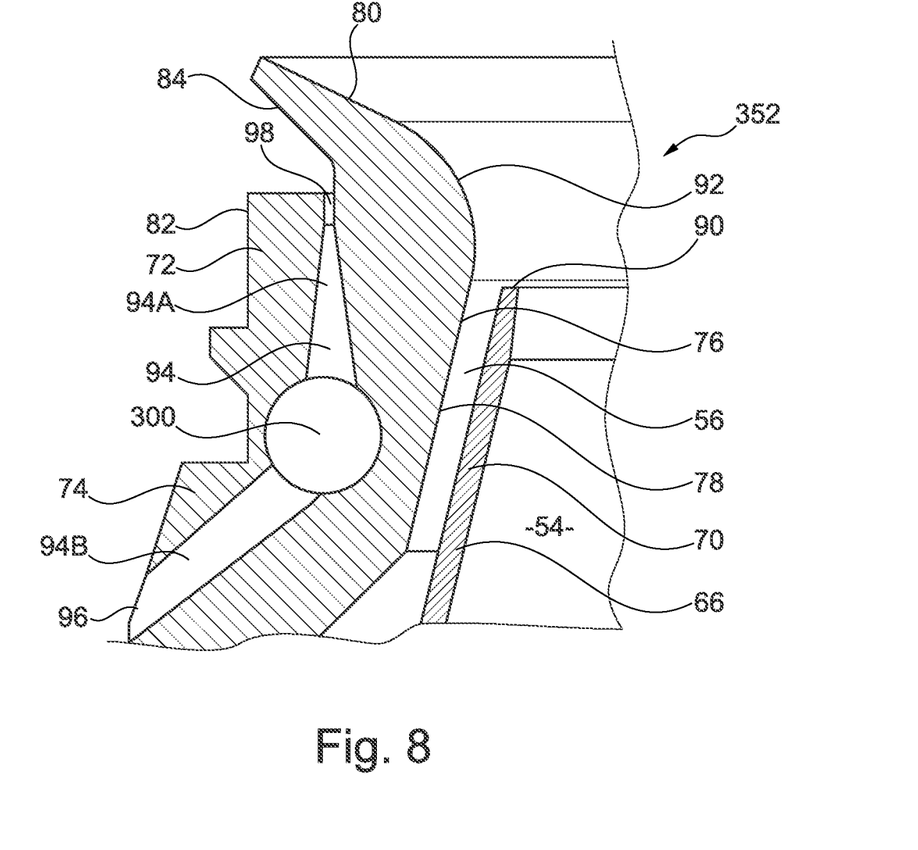
FIG. 8 is a further enlarged cross-sectional view of a portion of the air swirler arrangement shown in FIG. 7.

A further air swirler arrangement 352 according to the present disclosure is shown in FIGS. 7 and 8. The air swirler arrangement 352 is similar to that shown in FIGS. 3 and 4 and like parts are denoted by like numerals. The air swirler arrangement 352 differs in that the third member 72 has an annular chamber 300 arranged therein. The annular chamber 400 is arranged coaxially within the third member 72. Each passage 94 has a first portion connecting the inlet 96 and the annular chamber 300 and a second portion connecting the annular chamber 300 and the outlet 98. The first portions are the radially and axially extending portions 94B and the second portions are the axially extending portions 94A. The axially extending portions 94A are convergent, but may have a uniform cross-sectional area along there length.

Figure 9:
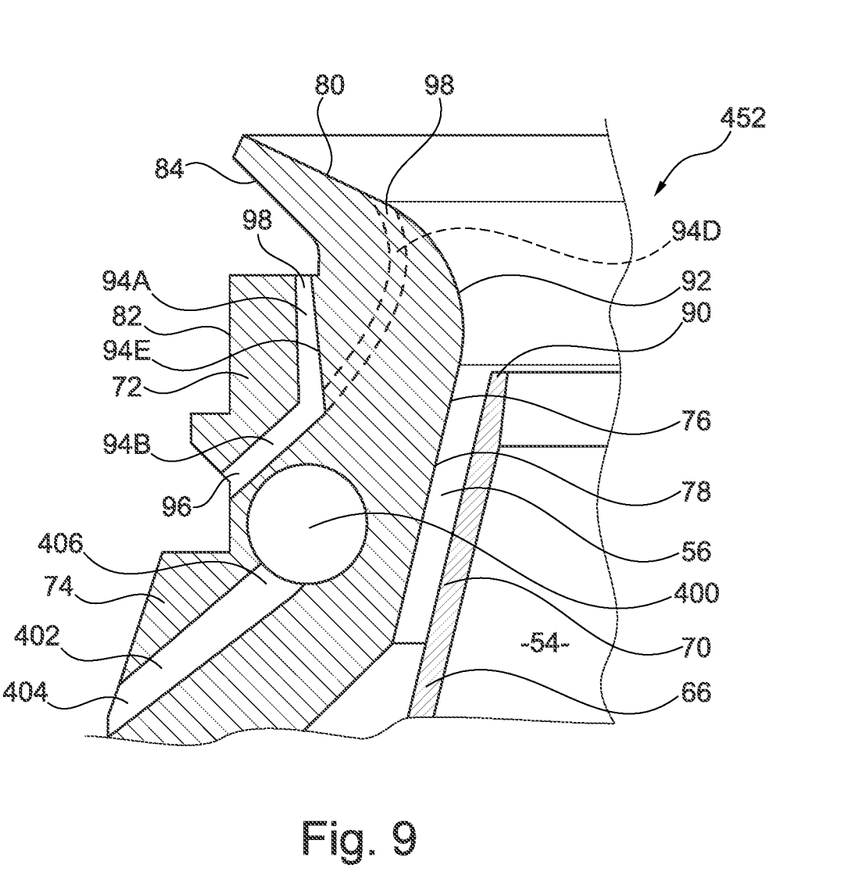
FIG. 9 is a cross-sectional view of a portion of an additional air swirler arrangement according to the present disclosure.

An additional air swirler arrangement 452 according to the present disclosure is shown in FIG. 9. The air swirler arrangement 352 is similar to that shown in FIGS. 3 and 4 and like parts are denoted by like numerals. The air swirler arrangement 452 differs in that the third member 72 has an annular chamber 400 arranged therein. The annular chamber 400 is arranged coaxially within the third member 72. The annular chamber 400 has a circular cross-section and there is a second plurality of circumferentially spaced passages 402 within the third member 72, each second passage 402 has an inlet 404 in the radially outer surface 82 of the third member 72 and an outlet 406 arranged to direct fluid into the annular chamber 400. The annular chamber 400 does not have any other outlets. The third member 72 also has the passages 94D to direct coolant onto divergent portion 84 of the radially outer surface 82 of the third member 72. Alternatively, the third member 72 also has the passages 94E to direct coolant onto the divergent portion 80 of the radially inner surface 76 of the third member 72, as shown by the dashed lines.

In operation the flow of coolant through the passaged 40 into the annular chamber 400 provides internal cooling of the bulk of the material of the third member 72. The annular chamber 400 takes the form of a donut shaped ring within the third member 72. The annular chamber 400 promotes mixing of coolant therein which improves heat transfer to the coolant, e.g. air. However, the mixing of coolant, air, within the annular chamber 400 reduces pressure from the flow of coolant, and hence would reduce the effectiveness of a cooling film if the coolant was discharged from the annular chamber 400 onto the divergent portion 84 of the radially outer surface 82 of the third member 72 or onto the divergent portion 80 of the radially inner surface 76 of the third member 72. To overcome this, the passages 94 used for cooling the divergent portion 84 of the radially outer surface 82 of the third member 72 or the divergent portion 80 of the radially inner surface 76 of the third member 72 are separate from the annular chamber 400.

In an additional air swirler arrangement, as shown in FIG. 9, the third member 72 has a first plurality of circumferentially spaced passages 94D to direct coolant onto the divergent portion 80 of the radially inner surface 76 of the third member 72 and the third member 72 also has a second plurality of circumferentially passages 94E to direct coolant onto divergent portion 84 of the radially outer surface 82 of the third member 72, as shown by the dashed lines. The first plurality of circumferentially spaced passages 94D and the second plurality of circumferentially spaced passages 94E are provided alternately circumferentially around the third member 72.

Each of the air swirler arrangements described is produced by additive manufacturing, such that the first member 62, the second member 66, the third member 72, the first plurality of swirl vanes 86 and the second plurality of swirl vanes 88 is a unitary monolithic structure. The air swirler arrangements may be produced by powder bed deposition, e.g. powder bed laser deposition or powder bed electron beam deposition. The air swirler arrangements are built up layer by layer in the axial direction of the air swirler arrangement. In order to manufacture the air swirler arrangements in one piece any radially extending coolant passages are built such that the coolant passages have angled roofs 95, as shown in FIG. 3A, in which the angle θ represents the maximum overhang angle which may vary from 30° to 60° relative to the axial direction. Similarly any radially extending passages formed the swirl vanes of the air swirlers have angled roofs 85, 89, as shown in FIG. 3B, in which the angle θ represents the maximum overhang angle which may vary from 30° to 60° relative to the axial direction.

Each of the air swirler arrangements described comprises an annular first member, an annular second member and an annular third member.

Although the present disclosure has been described with reference to an annular combustion chamber it is equally applicable to a tubular combustion chamber of a can-annular combustion chamber.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An air swirler arrangement comprising a coaxial arrangement of an inner air swirler passage and an outer air swirler passage, each air swirler passage comprising a radial flow swirler, the air swirler arrangement comprising an annular first member arranged radially relative to a major axis of the air swirler arrangement, the annular first member having a central aperture, an annular second member spaced axially from the annular first member and arranged coaxially with the major axis of the air swirler arrangement, the annular second member having a radially extending upstream portion and an axially extending convergent portion, an annular third member arranged coaxially around the annular second member, the annular third member having a radially extending upstream portion spaced axially downstream from the radially extending upstream portion of the annular second member, the annular third member having a radially inner surface having an axially extending convergent portion and a divergent downstream portion and a radially outer surface having the divergent downstream portion, a first plurality of circumferentially spaced swirl vanes of the radial flow swirler of the inner air swirler passage extending axially between the annular first member and the radially extending upstream portion of the annular second member, a second plurality of circumferentially spaced swirl vanes of the radial flow swirler the outer air swirler passage extending axially between the radially extending upstream portion of the annular second member and the radially extending upstream portion of the annular third member, the annular first member, the annular second member, the annular third member, the first plurality of swirl vanes and the second plurality of swirl vanes is a unitary monolithic structure, a plurality of circumferentially spaced passages within the annular third member, wherein each circumferentially spaced passage has an inlet in the radially outer surface of the annular third member and an outlet arranged to direct fluid onto the divergent portion of the radially inner surface of the annular third member or arranged to direct fluid onto the divergent portion of the radially outer surface of the annular third member, wherein each circumferentially spaced passage has a convergent portion adjacent the outlet and each circumferentially spaced passage does not diverge between the convergent portion and the outlet.

2. The air swirler arrangement as claimed in claim 1 wherein each circumferentially spaced passage has a circular outlet or a rectangular outlet.

3. The air swirler arrangement as claimed in claim 1 wherein the outlet of each circumferentially spaced passage opens into an annular slot.

4. The air swirler arrangement as claimed in claim 1 wherein the outlet of each circumferentially spaced passage is arranged tangentially to the divergent portion of the radially outer surface of the third member.

5. The air swirler arrangement as claimed in claim 1 wherein the outlet of each circumferentially spaced passage is arranged at a shallow angle to the divergent portion of the radially inner surface of the third member.

6. The air swirler arrangement as claimed in claim 5 wherein the shallow angle is 20° or less.

7. The air swirler arrangement as claimed in claim 5 wherein the shallow angle is 15° or less.

8. The air swirler arrangement as claimed in claim 5 wherein the shallow angle is 10° or less.

9. The air swirler arrangement as claimed in claim 1 wherein each circumferentially spaced passage has one or more axially extending portions, and wherein each axially extending portion of the one or more axially extending portions has a circular cross-section.

10. The air swirler arrangement as claimed in claim 1 wherein each circumferentially spaced passage has one or more radially and axially extending portions, wherein each radially and axially extending portion of the one or more radially and axially extending portions is part circular in cross-section and has an angled roof defined by two intersecting tangents to the part circular portion, and wherein the angled roof defines the radially outer surface of the circumferentially spaced passage.

11. The air swirler arrangement as claimed in claim 1 wherein the third member has an annular chamber arranged therein.

12. The air swirler arrangement as claimed in claim 11 wherein at least some of the circumferentially spaced passages have a first portion connecting the inlet and the annular chamber and a second portion connecting the annular chamber and the outlet.

13. The air swirler arrangement as claimed in claim 11 wherein the annular chamber is arranged coaxially within the third member.

14. A combustion chamber comprising an upstream end wall having at least one aperture, each aperture having an air swirler arrangement arranged coaxially therein, each aperture having an associated fuel injector,
   each air swirler arrangement comprising a coaxial arrangement of an inner air swirler passage and an outer air swirler passage, each air swirler passage comprising a radial flow swirler, the air swirler arrangement comprising an annular first member arranged radially relative to a major axis of the air swirler arrangement, the annular first member having a central aperture,
   an annular second member spaced axially from the annular first member and arranged coaxially with the major axis of the air swirler arrangement, the annular second member having a radially extending upstream portion and an axially extending convergent portion,
   an annular third member arranged coaxially around the annular second member, the annular third member having a radially extending upstream portion spaced axially from the radially extending upstream portion of the annular second member, the annular third member having a radially inner surface having a convergent portion and a divergent downstream portion and a radially outer surface having the divergent downstream portion,
   a first plurality of circumferentially spaced swirl vanes extending axially between the annular first member and the radially extending upstream portion of the annular second member,
   a second plurality of circumferentially spaced swirl vanes extending axially between the radially extending upstream. portion of the annular second member and the radially extending upstream portion of the annular third member,
   the annular first member, the annular second member, the annular third member, the first plurality of swirl vanes and the second plurality of swirl vanes is a unitary monolithic structure,
   a plurality of circumferentially spaced passages within the annular third member, wherein each circumferentially spaced passage has an inlet in the radially outer surface of the annular third member and an outlet arranged to direct fluid onto the divergent portion of the radially inner surface of the annular third member or arranged to direct fluid onto the divergent portion of the radially outer surface of the annular third member, wherein each circumferentially spaced passage has a convergent portion adjacent the outlet and each circumferentially spaced passage does not diverge between the convergent portion and the outlet, each air swirler arrangement having the fuel injector arranged in the central aperture in the annular first member.

15. The combustion chamber as claimed in claim 14 wherein the combustion chamber is an annular combustion chamber, and wherein the at least one aperture comprises a plurality of circumferentially spaced apertures.

16. A method of manufacturing an air swirler arrangement, the air swirler arrangement comprising a coaxial arrangement of an inner air swirler passage and an outer air swirler passage, each air swirler passage comprising a radial flow swirler,
   the air swirler arrangement comprising an annular first member arranged radially relative to a major axis of the air swirler arrangement, the annular first member having a central aperture,
   an annular second member spaced axially from the annular first member and arranged. coaxially with the major axis of the air swirler arrangement, the annular second member having a radially extending upstream portion and an axially extending convergent portion,
   an annular third member arranged coaxially around the annular second member, the annular third member having a radially extending upstream portion spaced axially downstream from the radially extending upstream portion of the annular second member, the annular third member having a radially inner surface having an axially extending convergent portion and a divergent downstream portion and a radially outer surface having the divergent downstream portion,
   a first plurality of circumferentially spaced swirl vanes of the radial flow swirler of the inner air swirler passage extending axially between the annular first member and the radially extending upstream portion of the annular second member,
   a second plurality of circumferentially spaced Swirl vanes of the radial flow swifter of the outer air swirler passage extending axially between the radially extending upstream portion of the annular second member and the radially extending upstream portion of the annular third member,
   the annular first member, the annular second member, the annular third member, the first plurality of swirl vanes and the second plurality of swirl vanes is a unitary monolithic structure,
   a plurality of circumferentially spaced passages within the annular third member, wherein each circumferentially spaced passage has an inlet in the radially outer surface of the annular third member and an outlet arranged to direct fluid onto the divergent portion of the radially inner surface of the annular third member or arranged to direct fluid onto the divergent portion of the radially outer surface of the annular third member, wherein each circumferentially spaced passage has a convergent portion adjacent the outlet and each circumferentially spaced passage does not diverge between the convergent portion and the outlet, the method comprising manufacturing the air swirler arrangement by additive manufacturing.

17. The method as claimed in claim 16 comprising manufacturing the air swirler arrangement by powder bed deposition.

18. The method as claimed in claim 16 comprising building the air swirler arrangement layer by layer in an axial direction of the air swirler arrangement.

\* \* \* \* \*